Feb. 20, 1945.    R. W. JOHNSON ET AL    2,369,739
OIL CONTROL DEVICE
Filed Oct. 18, 1941    2 Sheets-Sheet 1
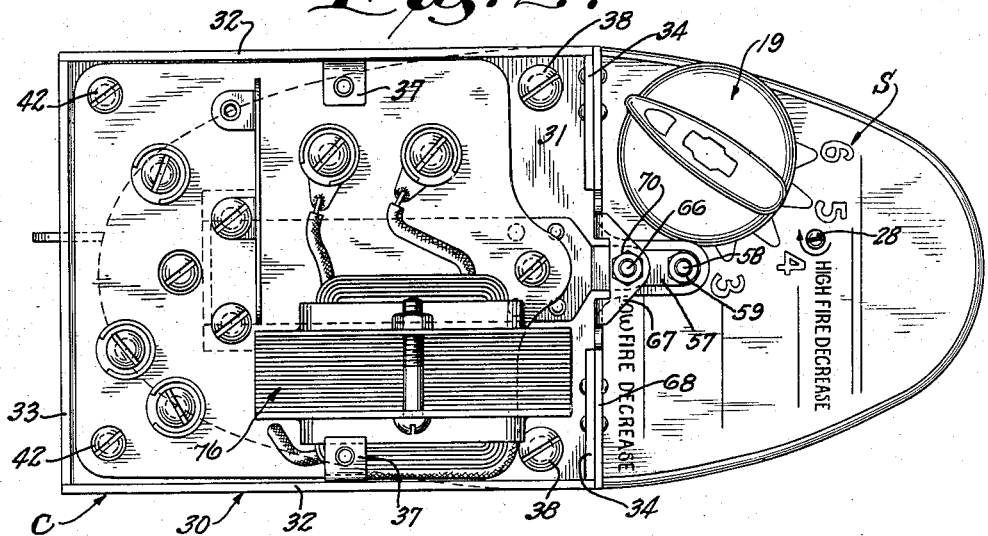
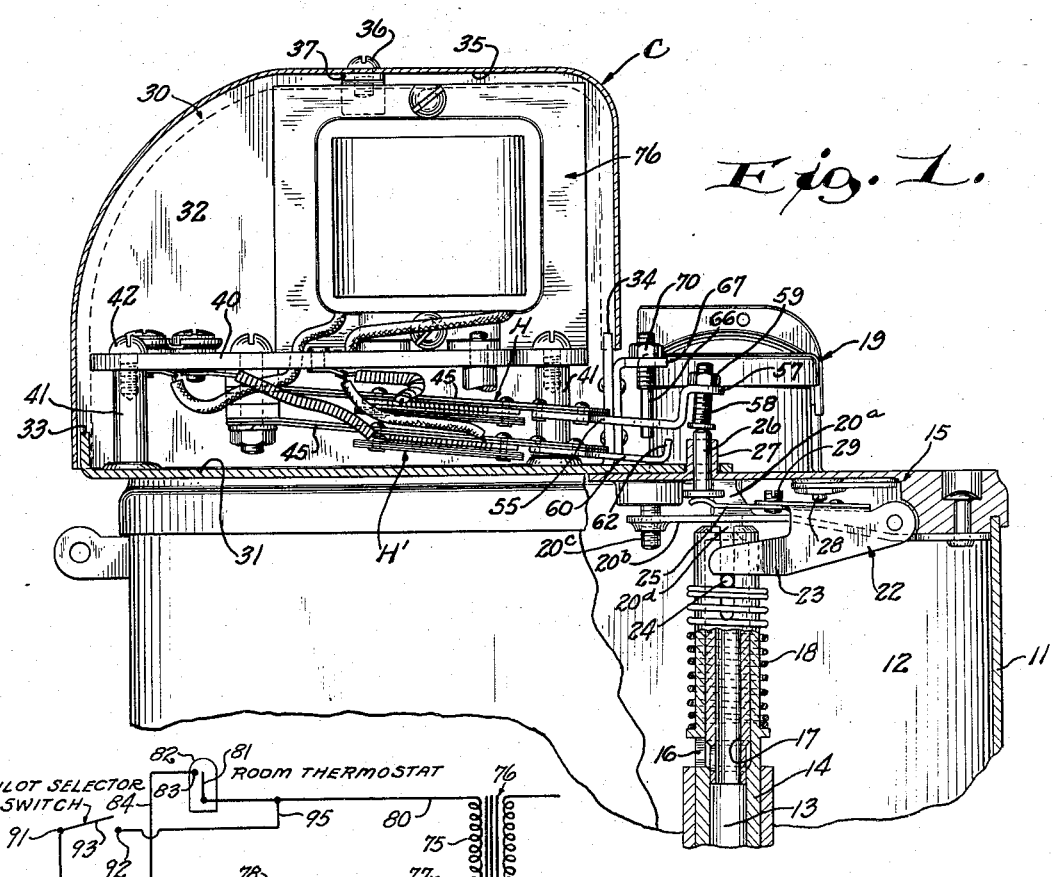
INVENTOR.
JOHN MILLER.
ROY W. JOHNSON.
BY
John W. Michael
ATTORNEY.

Feb. 20, 1945.    R. W. JOHNSON ET AL    2,369,739
OIL CONTROL DEVICE
Filed Oct. 18, 1941    2 Sheets-Sheet 2
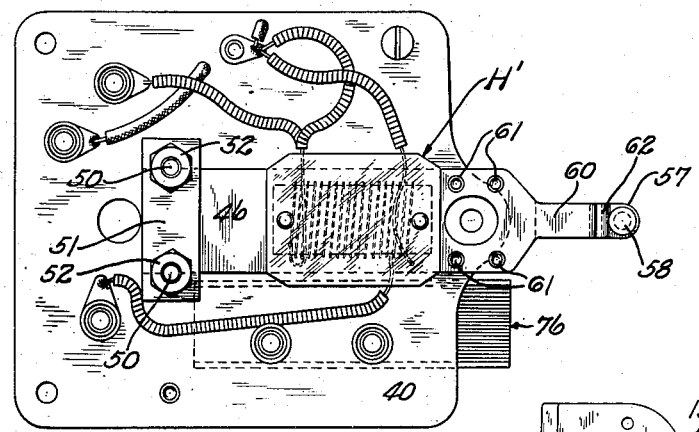
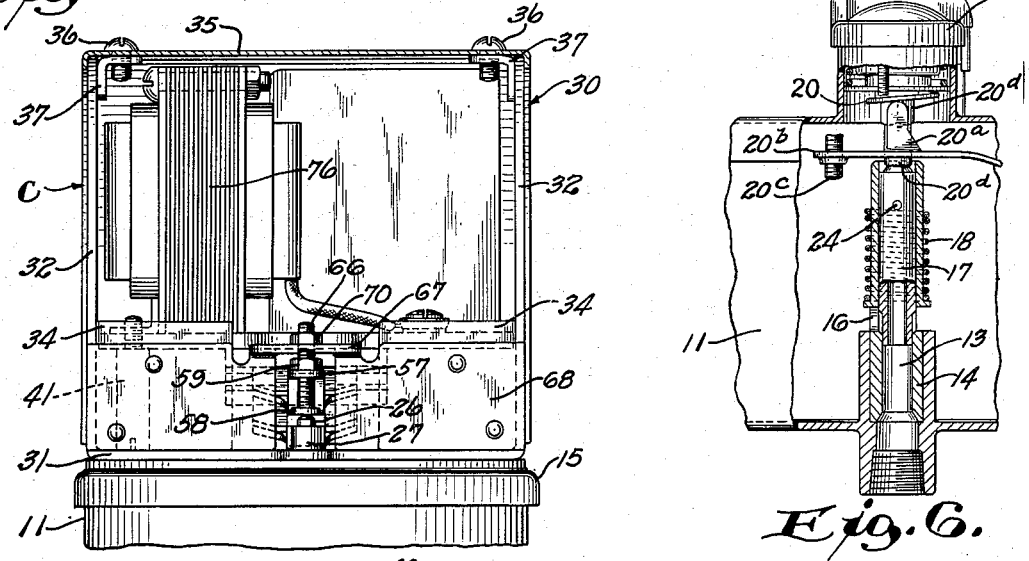
INVENTOR.
JOHN MILLER.
ROY W. JOHNSON.
BY John W. Michael
ATTORNEY.

Patented Feb. 20, 1945

2,369,739

UNITED STATES PATENT OFFICE 2,369,739

OIL CONTROL DEVICE

Roy W. Johnson, Milwaukee, Wis., and John Miller, Lansing, Mich., assignors to Automatic Products Company, Milwaukee, Wis., a corporation of Wisconsin Application October 18, 1941, Serial No. 415,584

14 Claims. (Cl. 236—68)

This invention relates to an improvement in control devices to be used in regulating the supply of liquid fuel to gravity feed oil burners.

Devices of this kind, as commonly employed, have a casing provided with a liquid supply chamber in which a constant level of the liquid fuel is being maintained. The liquid supply chamber is provided with an outlet connected to the burner. The oil flows through the outlet to the burner under the regulation of a metering valve which is adjustable either manually or thermostatically, or under both manual and thermostatic control, to provide for a low pilot flame at the burner or for intermediate or high burner flames, depending upon the adjustment of the valve. With such a construction, however, any adjustment of the pilot flame must be made at the control itself, and sometimes, especially where the control is located in the basement, this is inconvenient, and, of course, a manual adjustment must be made every time the height of the pilot flame is to be changed.

The object of the present invention is to provide a control device of this character which makes provision for either a high or low pilot flame, and renders the selection of either flame highly convenient, and, if desired, automatic. For example, the control may be under the conjoint influence of a room thermostat, that is, a thermostat located within the house or space to be heated, and an outside thermostat, whereby on cold days a high pilot fire is maintained, whereas upon an increase in the outside temperature the low pilot fire will automatically be brought into action.

In carrying out the present invention, the operating mechanism for the metering valve is placed under the conjoint control of two motors, such as two thermostatic leaves or bimetallic strips, each equipped with its own individual electric heating element. One of these heat motors controls the operation of the valve from the maximum open position, determined by the manual adjustment, to the low fire position. Whether the valve is shifted to the high or low pilot fire position depends, however, upon the position of the other thermostatic leaf, which functions after the manner of a stop, when it is moved into operative position, to limit the throw of the other thermostatic leaf in the direction towards valve-closing position. The electric heating elements of both heat motors are energized under the influence of appropriate control means. The heat motor which controls the operation of the valve throughout its range of action is usually controlled by a room thermostat whereas the other heat motor is controlled by an outside thermostat or a pilot selector switch of any suitable type.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a fragmentary view partly in side elevation and partly in longitudinal vertical cross section, illustrating an oil control device embodying the present invention;

Figure 2 is a view in top plan of the device shown in Figure 1 with the cover for the control casing removed;

Figure 3 is a view in bottom plan of the terminal board or panel and the parts carried thereby;

Figure 4 is a view in end elevation looking toward the left in Figures 1 and 2 and showing the cover of the control casing in cross section;

Figure 5 is a fragmentary detail view in vertical cross section illustrating the two heat motors and the manner of mounting them on the terminal board;

Figure 6 is a fragmentary view in vertical cross section illustrating the metering valve construction and the manually operable cam means for adjusting the same; and Figures 7 and 8 are diagrammatic views showing the electric circuits employed when the installations include an outside thermostat and a pilot selector switch, respectively.

Referring to the drawings, it will be seen that the constant level oil control device, in which the present invention is embodied, comprises a main casing, designated generally at 11, and having a liquid supply chamber 12 therein. Liquid fuel is supplied to and maintained at a constant level in said chamber 12 by mechanism (not shown) but well-known and widely used in this art and fully disclosed and claimed in United States Letters Patent 2,068,138, granted January 19, 1937, and Patent 2,120,364, granted June 14, 1938.

The liquid flows out of the main chamber 12 through an outlet passage 13, which is connected to the burner (not shown). A tubular valve guide 14 has its lower end press-fitted or otherwise suitably secured in the upper portion of the outlet passage 13, the valve guide extending vertically in the casing and terminating a short distance below the cover 15 of main casing 11. The guide 14 is provided with a lateral opening 16 which provides for communication between the interior of the valve guide 14 and the liquid supply chamber 12.

A metering valve 17 is slidably fitted in the tubular valve guide 14 and meters or regulates the flow from the supply chamber 12 to the burner. A spring 18 biases the valve 17 to open position.

A manually adjustable control knob 19 is mounted on the cover 15 of the main casing above the metering valve 17 and acts through a cam 20 (see Figure 6) with which it is interconnected to control the position of the metering valve 17. The active face of the cam 20 rides on an abutment lug 20a, which may be integrally formed with an adjustable supporting arm 20b. An adjusting screw 20c controls the position of the supporting arm 20b. When the knob 19 is turned, the cam 20 riding on the abutment lug 20a will raise or lower the knob 19, depending upon the direction of rotation, and will also correspondingly raise and lower a valve-operating stud 20d which bears on the upper end of the metering valve 17 to control the position thereof. The knob 19 may be adjusted to cause the cam 20 to move the metering valve 17 to completely closed or shut-off position, or may be adjusted to allow the valve 17, under the regulation of its thermostatic control means to be hereinafter described, to move to full open position to any one of several intermediate positions, as indicated by the scale or dial indicated at S in Figure 2.

In addition to the manually operable cam means, lever mechanism, designated generally at 22, is provided, this lever mechanism having a lever arm 23 engageable with the guide pin 24 of the valve 17, and also having a lever arm 25 engageable with the lower headed end of a pin 26 slidably fitted in a bearing 27 provided therefor on the cover 15 of the main casing. High and low fire stops, designated at 28 and 29, control the extreme positions of the lever mechanism 22. The details of the construction of the metering valve 17 and its lever mechanism 22 need not be further described since per se they are not part of the present invention and are fully disclosed and claimed in the patent issued to Roy W. Johnson, one of the joint inventors of this case, for "Conversion oil control devices," on April 20, 1943, No. 2,317,063.

A control unit, designated generally at C, is supported on and detachably secured to the cover 15 of the main casing. The control unit C includes a sheet metal casing or housing, designated generally at 30, which may comprise a bottom plate 31, parallel vertical side walls 32 integral with the bottom plate 31, an upturned cross flange 33 extending transversely of the rear edge of the bottom plate 31, and transversely extending and spaced upright front pieces 34 integral with the front edge of the bottom plate 31. A removable top or cover 35 completes the enclosure afforded by the housing 30. The cover 35 is removable, but when assembled is detachably secured in position by screws 36 passing through openings in the cover and threadedly engaged with angular lugs 37 spot welded or otherwise suitably fixed to the side walls 32 of the housing 30. Screws 38 (see Figure 2) detachably secure control unit C to the cover plate 15 of the main casing 11.

A horizontal terminal board or panel 40 of insulating material is supported within the control housing 30 above the bottom plate 31 thereof by means of posts 41, the terminal board resting on the tops of the posts 41 and being secured into position thereon by screws 42.

Heat motors of the relay, auxiliary heater type, designated at H and H', are supported on the under side of the terminal board. These motors are of identical construction in that each includes a bimetallic or thermostatic strip or leaf 45. An electric heating element 46, encased in a wrapping 47 of mica, or other suitable electric insulating material, is supported on each bimetallic leaf 45 in heat interchanging relationship therewith. Rivets or the like 48 coact with the mica casing or wrapper of the heating element to secure the electric heating element in position on its leaf. The thermostatic leaves 45 are disposed one above the other and their inner ends have vertically alined openings through which bolts 50 pass. Spacing blocks 51 of insulating material are interposed between the terminal board and between the thermostatic leaves, and these parts are all held assembled and suspended from the terminal board by the bolts 50 and their cooperable nuts 52 and lock washers 53.

The free end of the bimetallic leaf 45 of the heat motor H is provided with an extension or valve operating arm 55. A portion of this arm 55 is riveted as at 56 to the bimetallic leaf. The outer end of the arm 55 is upwardly offset, as at 57, and its offset portion 57 is formed with a threaded opening to receive an adjusting screw 58. The lower end of the screw 58 is headed and in the assembly is positioned to engage the upper end of the motion transmission pin 26. A nut 59 releasably secures screw 58 in any adjustment.

The bimetallic leaf 45 of the heat motor H' is provided with an extension or stop arm 60, riveted as at 61 to the free end of the leaf 45 of the heat motor H', and having its outer end upturned as at 62 so as to be engageable with the valve-operating arm 55 in certain adjustments.

The extent to which the stop 60 may move upwardly is limited by means of an adjustable stop screw 66 threaded through an opening provided therefor in a supporting lug 67. The lug 67 may be integrally formed with a front plate 68 riveted to the front pieces 34 and centrally apertured below the lug to allow the arm 55 and stop 60 to project outwardly beyond the control casing. The arm 55 is formed with an opening 55' through which the stop screw 66 loosely extends. A nut 70 releasably secures the top screw 66 in any selected adjustment.

The control device described may be regulated in its action in various ways, as illustrated, for example, in Figures 7 and 8. In both of the applications shown in Figures 7 and 8, the secondary winding 75 of a step-down transformer, designated generally at 76, has one terminal connected by a conductor 77 and branches 78 and 79 of said conductor 77 with one terminal of the electric heating elements 46 of the heat motors H and H', respectively. The other terminal of the secondary winding 75 of the transformer 76 is connected by a wire 80 to the movable contact leaf 81 of the room thermostat, designated generally at 82. The fixed contact 83 of the room thermostat 82 is connected by a wire 84 to the opposite terminal of the electric heating element 46 of the heat motor H from that to which the wire 78 connects.

In the form of the application of the invention shown in Figure 7, the energization of the electric heating element 46 of the heat motor H' is regulated by the outside thermostat, designated generally at 85. The contact leaf 86 of the outside thermostat 85 is connected by a wire 87 to the wire 80, and consequently to one side of the secondary winding of the transformer 76. The fixed contact 89 of the outside thermostat 85 is connected by a wire 90 to the terminal of the electric heating element 46 of the heat motor H' opposite that to which the wire 79 connects.

With the construction shown in Figure 7, the outside thermostat is set to respond to its selected temperature, and if the temperature drops below its setting, the contact leaf 86 will engage the fixed contact 89 so that current will flow from the secondary winding 75 of transformer 76 to the wires 80 and 87, contact leaf 86, fixed contact 89, wire 90, electric heating element 46 of the heat motor H', wires 79 and 77, back to the other terminal of the secondary winding 75. This will cause the thermostatic or bimetallic strip 45 to warp upwardly and bring its stop element 62 into engagement with the valve-operating arm 55 to insure a high pilot position of metering valve 17 as long as the room thermostat 82 is satisfied. Of course, if the room thermostat 82 calls for heat, the thermostatic or bimetallic leaf 45 of heat motor H will be warped upwardly to allow the valve 17 to further open and thereby obtain a higher fire, since when the room thermostat 82 calls for heat, contact leaf 81 engages fixed contact 83 and current then flows from the secondary winding 75 of transformer 76, through wire 80, contact leaf 81, fixed contact 83, wire 84, electric heating element 46 of heat motor H and wires 78 and 77, back to the other terminals of the secondary winding 75.

The application shown in Figure 8 is identical with that shown in Figure 7, save that the outside thermostat 85 is omitted and is replaced by a suitable pilot selector switch, designated generally at 91. This switch is diagrammatically illustrated as having a fixed contact 92 and a movable blade 93. The blade 93 is connected by a wire 94 to the terminal of the electric heating element 46 of heat motor H' opposite to that to which the wire 79 connects. Contact 92 is connected by wire 95 to the wire 80. When the pilot selector switch 91 is closed, the electric heating element 46 of heat motor H' will be energized since at such time current will flow from the secondary winding 75 of transformer 76, wires 80 and 95, contacts 92 and 93, wire 94, electric heating element 46 of heat motor H', and wires 79 and 77, back to the secondary winding of the transformer. Just as in the other application the energization of the electric heating element 46 of heat motor H' will warp thermostatic leaf 45 upwardly and so position its stop element 62 that the valve-operating arm 55 cannot move downwardly beyond high pilot fire position.

While we have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

We claim:

1. A control device of the character described comprising a casing having a liquid supply chamber provided with an outlet, a metering valve for regulating flow through said outlet for low pilot, high pilot, and high fire operation, a motor for shifting the valve from high fire to low pilot fire position, a thermostat controlling the action of said motor, a second motor, operable when energized, to directly contact said first-named motor so as to cause it to limit the movement of the valve in one direction under the influence of said first-named motor to a high pilot fire position, and a control device independent of said thermostat for regulating the action of said second motor.

2. A control device of the character described comprising a casing having a liquid supply chamber provided with an outlet, a metering valve for regulating flow through said outlet for low pilot, high pilot, and high fire operation, a valve-operating element, a motor connected to said element to actuate the same and control the position of the valve from the low pilot fire position to high fire position, a thermostat for controlling the action of said motor, a shiftable stop directly engageable with said element to limit its movement in one direction to such extent as to cause the valve, when said thermostat is satisfied, to assume a high pilot fire position, a motor for shifting said stop, and a control device independent of said thermostat for regulating the action of said second motor.

3. A control device of the character described comprising a casing having a liquid supply chamber provided with an outlet, a metering valve for regulating flow through said outlet for low pilot, high pilot, and high fire operation, a valve-operating element, a motor connected to said element to actuate the same and control the position of the valve from the low pilot fire position to high fire position, a room thermostat for controlling the action of said motor, a shiftable stop directly engageable with said element to limit its movement in one direction to such extent as to cause the valve, when said thermostat is satisfied, to assume a high pilot fire position, a motor for shifting said stop, and an outside thermostat for regulating the action of said second motor.

4. A control device of the character described comprising a casing having a liquid supply chamber provided with an outlet, a metering valve for regulating flow through said outlet for low pilot, high pilot, and high fire operation, a heat motor for shifting said valve from high fire to low pilot fire position, a room thermostat controlling the action of said heat motor, a second heat motor operable when energized into contact with the first said heat motor to limit the movement of the valve in one direction under the influence of said first-named heat motor to a high pilot fire position, and an outside thermostat for regulating the action of said second-named heat motor.

5. A control device of the character described comprising a casing having a liquid supply chamber provided with an outlet, a metering valve for regulating flow through said outlet for low pilot, high pilot, and high fire operation, a heat motor for shifting said valve from high fire to low pilot fire position, a room thermostat controlling the action of said heat motor, a second heat motor operable when energized into contact with the first said heat motor to limit the movement of the valve in one direction under the influence of said first-named heat motor to a high pilot fire position, and a pilot selector switch for regulating the action of said second-named heat motor.

6. A control device of the character described comprising a casing having a liquid supply chamber provided with an outlet, a metering valve for regulating flow through said outlet for low pilot, high pilot, and high fire operation, a bimetallic leaf cooperable with the metering valve to control the position thereof from a high fire position to a low pilot fire position, an electric heating element combined with said bimetallic leaf, a thermostat for regulating the supply of current to said electric heating element, a second bimetallic leaf operable to directly engage said first-named bimetallic leaf so as to cause it to limit the movement of the valve in one direction under the influence of said first-named bimetallic leaf to a high pilot fire position, an electric heating element combined with said second named bimetallic leaf, and a control device independent of said thermostat for energizing and deenergizing the electric heating element of said second named bimetallic leaf.

7. A control device of the character described comprising a casing having a liquid supply chamber provided with an outlet, a metering valve for regulating flow through said outlet, a bimetallic leaf, a valve-operating arm secured to the free end of the leaf and coacting with the valve to shift the same from high fire to low pilot fire position upon warping of said bimetallic leaf, an electric heating element combined with said leaf, a thermostat for regulating the supply of current to said electric heating element, a second bimetallic leaf disposed below the first-named leaf, a stop arm secured to the free end of said second-named leaf and engageable with the valve-operating arm on warping of the second-named leaf to limit the movement thereof in one direction, under the influence of said first-named bimetallic leaf, to a position which results in a high pilot fire position of the metering valve, an electric heating element combined with said second-named leaf, and a control device independent of said thermostat for regulating the action of said last-named electric heating element.

8. A control device of the character described comprising a casing having a liquid supply chamber provided with an outlet, a metering valve for regulating flow through said outlet, a bimetallic leaf, a valve-operating arm secured to the free end of the leaf and coacting with the valve to shift the same from high fire to low pilot fire position upon warping of said bimetallic leaf, an electric heating element combined wth said leaf, a thermostat for regulating the supply of current to said electric heating element, a second bimetallic leaf disposed below the first-named leaf, a stop arm secured to the free end of said second-named leaf and engageable with the valve-operating arm on warping of the second-named leaf to limit the movement thereof in one direction, under the influence of said first-named bimetallic leaf, to a position which results in a high pilot fire position of the metering valve, an electric heating element combined with said second-named leaf, a control device independent of said thermostat for regulating the action of said last-named electric heating element, and an adjustable stop screw cooperable with the stop arm to limit the operative movement thereof under the influence of its bimetallic leaf.

9. A control device of the character described comprising a main casing having a liquid fuel supply chamber provided with an outlet, a metering valve for regulating flow through said outlet for low pilot, high pilot, and high fire operation, lever mechanism mounted in the main casing and cooperable with the valve for shifting the same from high fire to low pilot fire position, a cover for the main casing having an opening overlying said lever mechanism, a motion transmission pin slidable through said opening and operatively interengaged with the lever mechanism within the casing, said pin projecting beyond the casing, a control housing mounted on and secured to the cover of the casing at one side of said pin, a terminal board of insulating material supported within the housing in spaced relation to the walls thereof, a bimetallic leaf supported on the terminal board, a valve-operating arm secured to the free end of the bimetallic leaf projecting outwardly beyond the control housing and engageable with the outer end of said motion transmission pin, an electric heating element combined with said bimetallic leaf, a thermostat for regulating the supply of current to said electric heating element, a second bimetallic leaf supported on said terminal board below said first-named bimetallic leaf, an electric heating element combined with said second bimetallic leaf, a second thermostat for regulating the supply of current to said last named heating element, a stop arm secured to the free end of said second-named bimetallic leaf and engageable with said valve-operating arm upon warping of said second-named leaf, to limit movement thereof in one direction, under the influence of said first-named bimetallic leaf, to a position which results in the high pilot position of the metering valve.

10. A control device of the character described comprising a main casing having a liquid fuel supply chamber provided with an outlet, a metering valve for regulating flow through said outlet for low pilot, high pilot, and high fire operation, a lever mechanism mounted in the main casing and cooperable with the valve for shifting the same from high fire to low pilot fire position, a cover for the main casing having an opening overlying said lever mechanism, a motion transmission pin slidable through said opening and operatively interengaged with the lever mechanism within the casing, said pin projecting beyond the casing, a control housing mounted on and secured to the cover of the casing at one side of said pin, a terminal board of insulating material supported within the housing in spaced relation to the walls thereof, a bimetallic leaf supported on the terminal board, a valve-operating arm secured to the free end of the bimetallic leaf projecting outwardly beyond the control housing and engageable with the outer end of said motion transmission pin, an electric heating element combined with said bimetallic leaf, a thermostat for regulating the supply of current to said electric heating element, a second bimetallic leaf supported on said terminal board below said first-named bimetallic leaf, an electric heating element combined with said second bimetallic leaf, a second thermostat for regulating the supply of current to said last named heating element, a stop arm secured to the free end of said second-named bimetallic leaf and engageable with said valve-operating arm upon warping of said second-named leaf, to limit movement thereof in one direction, under the influence of said first-named bimetallic leaf, to a position which results in the high pilot position of the metering valve, said valve-operating arm having a portion thereof projecting beyond the casing provided with an opening, a bracket on the casing overlying the opening of the valve-operating arm, and a stop screw adjustably mounted on the bracket extending down to the opening of the valve-operating arm and engageable with the stop arm to limit the operative movement thereof under the influence of its bimetallic leaf.

11. A control device for use in regulating the supply of liquid fuel to gravity feed oil burners comprising a casing having a liquid supply chamber provided with an outlet, a metering valve for regulating flow through said outlet for low pilot, high pilot, and high fire operation, manually adjustable cam means for controlling the position of the valve from fully closed position through intermediate fire positions to high fire positions, lever mechanism also interconnected with the valve for controlling the position thereof within the range permitted by the manually adjustable cam means, a stop device arresting the motion of the lever mechanism when the valve is shifted thereby to low pilot fire position, a bimetallic leaf operatively interconnected with the lever mechanism to control the action thereof, an electric heating element combined with said leaf, a room thermostat for regulating the supply of current to said heating element, a second bimetallic leaf operatively interrelated with the first bimetallic leaf, an electric heating element combined with said second bimetallic leaf, a second thermostat for regulating the supply of current to said last named heating element, whereby said second bimetallic leaf is caused to abut said first bimetallic leaf to shift the first bimetallic leaf from a position in which the valve is at low pilot fire position to a position at which the valve is at high pilot fire position, and a stop device cooperable with said second bimetallic leaf for determining the high pilot fire position of the valve.

12. A control device of the character described comprising a casing having a liquid supply chamber provided with an outlet, a metering valve for regulating flow through said outlet for low pilot, high pilot, and high fire operation, a single lever mechanism interconnected with the valve and controlling the position thereof, a stop device for arresting movement of the lever mechanism when the valve is shifted thereby to low pilot fire position, a heat motor operating the lever mechanism and controlled in its action by means responsive to the room temperature, a second heat motor directly contacting the first heat motor and acting when energized to limit the movement of the first heat motor in one direction to a high pilot fire position, and means controlling the action of the second heat motor.

13. A control device of the character described comprising a casing having a liquid supply chamber provided with an outlet, a metering valve biased to high fire position for regulating flow through the outlet for low pilot, high pilot, and high fire operation, a bimetallic leaf operatively interconnected with the valve and controlling the position thereof, said leaf when cold moving in one direction to shift the valve to low pilot fire position and when heated moving in another direction to shift the valve to high fire position, an auxiliary heater for said leaf, a thermostat for regulating the action of the auxiliary heater, a second bimetallic leaf cooperable with the first bimetallic leaf, an auxiliary heater for the second bimetallic leaf, and an independent thermostat regulating the action of said last mentioned auxiliary heater, said second bimetallic leaf when heated warping in one direction to directly contact said first bimetallic leaf to cause it to limit the movement of the first bimetallic leaf when cold to cause the valve to assume a high pilot fire position.

14. A control device of the character described comprising a casing having a liquid supply chamber provided with an outlet, a metering valve biased to high fire position for regulating flow through the outlet for low pilot, high pilot, and high fire operation, a bimetallic leaf operatively interconnected with the valve and controlling the position thereof, said leaf when cold moving in one direction to shift the valve to low pilot fire position and when heated moving in another direction to shift the valve to high fire position, an auxiliary heater for said leaf, a thermostat for regulating the action of the auxiliary heater, a second bimetallic leaf cooperable with the first bimetallic leaf, an auxiliary heater for the second bimetallic leaf, an independent thermostat regulating the action of said last mentioned auxiliary heater, said second bimetallic leaf when heated warping in one direction to directly contact said first bimetallic leaf to cause it to limit the movement of the first bimetallic leaf when cold to cause the valve to assume a high pilot fire position, and an adjustable stop coacting with said second bimetallic leaf.

ROY W. JOHNSON.
JOHN MILLER.